United States Patent
Nygren et al.

(10) Patent No.: US 11,828,326 B2
(45) Date of Patent: Nov. 28, 2023

(54) CONTROL SYSTEM USING A CONTROL CABLE, AN ADAPTER ELEMENT FOR SUCH A SYSTEM, AND A CONTROL CABLE HAVING SUCH AN ADAPTER ELEMENT

(71) Applicant: ÅLÖ AB, Umeå (SE)

(72) Inventors: Tomas Nygren, Umeå (SE); Gustaf Lagunoff, Umeå (SE); Olof Gidlund, Bonässund (SE)

(73) Assignee: ÅLÖ AB, Umeå (SE)

( * ) Notice: Subject to any disclaimer, the term of this patent is extended or adjusted under 35 U.S.C. 154(b) by 14 days.

(21) Appl. No.: 17/561,209

(22) Filed: Dec. 23, 2021

(65) Prior Publication Data
US 2022/0120312 A1   Apr. 21, 2022

Related U.S. Application Data

(63) Continuation of application No. PCT/SE2020/000506, filed on Jun. 11, 2020.

(30) Foreign Application Priority Data

Jun. 26, 2019   (SE) .................................. 1950786-2

(51) Int. Cl.
*F16C 1/10*    (2006.01)
*F16C 1/16*    (2006.01)
(Continued)

(52) U.S. Cl.
CPC .............. *F16C 1/106* (2013.01); *F16C 1/145* (2013.01); *F16C 1/16* (2013.01); *E02F 9/2004* (2013.01); *F16C 2361/91* (2013.01)

(58) Field of Classification Search
CPC .. F16C 1/106; F16C 1/145; F16C 1/16; F16C 1/262; F16C 1/265; F16C 1/102;
(Continued)

(56) References Cited

U.S. PATENT DOCUMENTS

| | | | | |
|---|---|---|---|---|
| 4,418,583 A | * | 12/1983 | Taig ...................... | F16C 1/226 192/111.11 |
| 6,122,987 A | * | 9/2000 | Barbieri ................. | G05G 9/047 74/471 XY |

(Continued)

FOREIGN PATENT DOCUMENTS

| | | |
|---|---|---|
| DE | 60309115 T2 | 4/2007 |
| EP | 0032883 A2 | 7/1981 |

(Continued)

OTHER PUBLICATIONS

EPO Translation of the Description of FR 2730772 A1, Raccouard, Aug. 3, 1996. (Year: 2023).*

(Continued)

*Primary Examiner* — Daniel D Yabut
(74) *Attorney, Agent, or Firm* — Dinsmore & Shohl LLP

(57) ABSTRACT

A control system (1) for operating a mechanical function is disclosed. The system (1) includes a lever (11), a housing (13) and at least one control cable (3). The lever (11) is pivotable and includes at least one seat (9) for receiving a first coupling element (17) of the at least one control cable (3). The control system (1) further includes at least one adapter element (23), and the housing (13) further includes at least one first recess (25). The at least one seat (9) of the lever and the at least one first recess (25) of the housing (13) include first and second open spaces (33, 35) that are aligned with each other in an assembly direction (37). This allows for a simultaneous coupling of the first coupling element (17) to the at least one seat (9) and the adapter element (23) to the at least one first recess (25) of the housing (13), along said assembly direction (37).

15 Claims, 4 Drawing Sheets

(51) Int. Cl.
*F16C 1/14* (2006.01)
*E02F 9/20* (2006.01)

(58) Field of Classification Search
CPC .. F16C 1/103; F16C 1/105; F16C 1/12; F16C 2361/91; F16C 61/36
See application file for complete search history.

(56) References Cited

U.S. PATENT DOCUMENTS

| | | |
|---|---|---|
| 2004/0083842 A1 | 5/2004 | Teijeiro et al. |
| 2009/0120231 A1 | 5/2009 | Ruhlander et al. |

FOREIGN PATENT DOCUMENTS

| | | | | |
|---|---|---|---|---|
| EP | 874298 A2 * | 10/1998 | | F16C 1/106 |
| EP | 0939237 A2 | 9/1999 | | |
| FR | 2730772 A1 * | 8/1996 | | F16C 1/105 |
| FR | 2911376 A1 | 7/2008 | | |
| FR | 2911377 A1 | 7/2008 | | |
| JP | 5936829 A | 2/1984 | | |

OTHER PUBLICATIONS

International Search Report & Written Opinion issued in corresponding PCT Application No. PCT/SE2020/050606, dated Sep. 14, 2020.
Swedish Search Report issued in corresponding Sweden Application No. 1950786-2, dated Dec. 27, 2019.

* cited by examiner

Fig. 2a
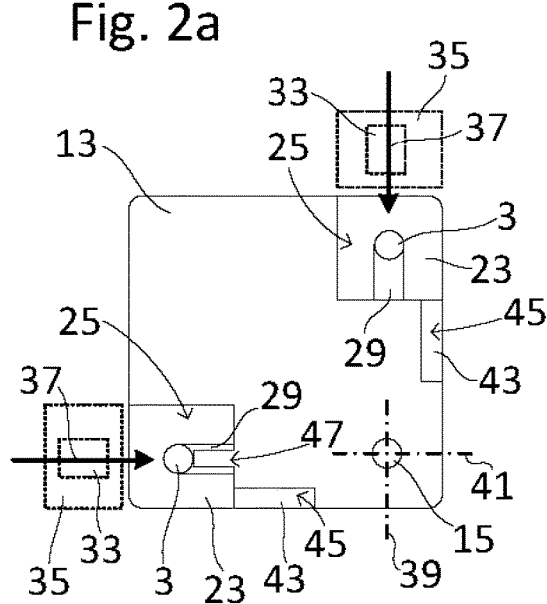
Fig. 2b
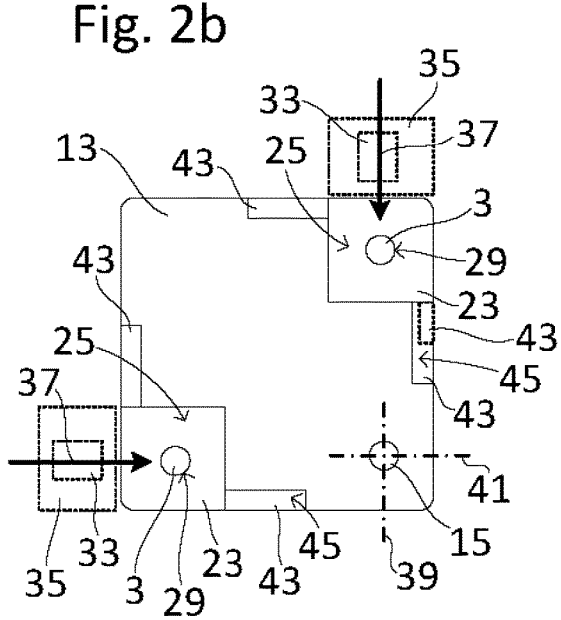
Fig. 2c
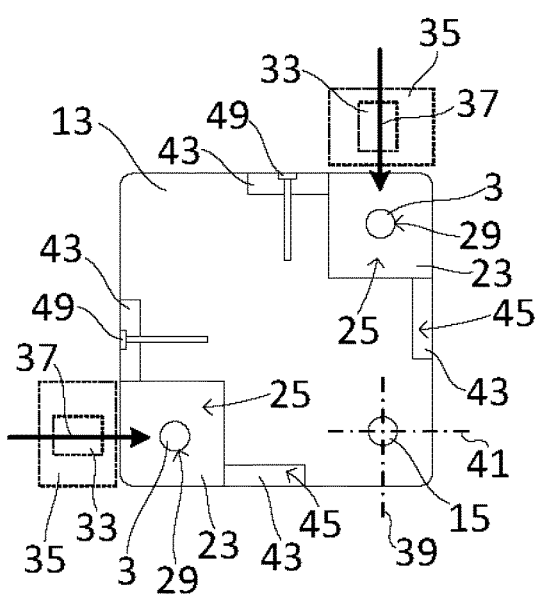
Fig. 2d

CONTROL SYSTEM USING A CONTROL CABLE, AN ADAPTER ELEMENT FOR SUCH A SYSTEM, AND A CONTROL CABLE HAVING SUCH AN ADAPTER ELEMENT

TECHNICAL FIELD

The invention relates to a control system for translating mechanical energy to operate a mechanical function, an adapter element for such a system, and a control cable having such an adapter element.

BACKGROUND ART

Despite the increase in digital technology and its technical solutions of today, there is still need for mechanical devices for some technical applications and in some technical fields. However, the technical standards have also increased due to an increased digitalization, as we get more and more used to very small yet highly functional systems of various kinds. This in turn leads to higher demands and expectations on mechanical solutions as well, as they now have to be integrated with digital systems and devices. Hence, mechanical functions often need to be designed in a slicker fashion, both to fit and be integrated with other types of devices and machinery, and to be able to fit inside housings, casings etc., that are often made smaller due to technology moving forward.

User friendliness is also of high importance for many technical applications, as it is more economically beneficial if an end user of a device or element may install and perform maintenance on their own.

One such technical application that is subject to the development and higher demands on criteria is control cables that are used to transfer mechanical energy to perform a mechanical function. Such control cables usually need to be very precise and securely fixed in their intended positions. Yet, it is also desirable that such control cables are fast and easy to install and replace when needed. It is not trivial to combine precision and ease of use given the high demand on the desired technical specifications that need to be fulfilled.

SUMMARY OF THE INVENTION

There is a need to develop a control system for operating a mechanical function using a control cable that is fast and easy to install and replace in said control system. There is also a need to develop a control system in which the control cable is securely attached when in use, yet still demands few intrusions to the rest of the system when installation and/or replacement of the control cable is performed. There is even further a need to develop an adapter element, which may be used to bridge the coupling of a control cable with such a control system, and a need to develop a control cable having such an adapter element.

An object of the invention is thus to provide a control system for operating a mechanical function using a control cable, which control cable is fast and easy to install and replace in said control system. Another object is to provide such a control system, in which the control cable is securely attached when in use, yet still demands few intrusions to the rest of the system when installation and/or replacement of the control cable is performed. An even further object is to provide an adapter element, which may be used to bridge the coupling of a control cable with such a control system, and to provide a control cable having such an adapter element.

According to a first aspect, a control system for operating a mechanical function is provided. The system may comprise a lever, a housing and at least one control cable. The lever may be pivotable in at least one direction about a pivot point and comprising at least one seat for receiving a first coupling element of the at least one control cable. The control cable may comprise the first coupling element, arranged at a first end of said control cable, and an outer casing, axially movable relative said control cable.

The housing may comprise the pivot point, and may be configured for receiving the at least one control cable and to hold the outer casing of said control cable in a fixed position, wherein when assembled, a pivoting movement of the lever moves the control cable axially relative the housing and the outer casing of the control cable. The axial movement of the control cable may be utilized for performing said mechanical function. The control system may further comprise at least one adapter element and the housing may further comprise at least one first recess, configured for receiving said adapter element, wherein the at least one adapter element and the at least one first recess may be form fitted with each other when coupled. Such a coupling may lock the adapter element relative the housing in the direction parallel with the axial direction of the control cable. The adapter element may comprise a body with a second recess therein, which may be configured for receiving the outer casing of the control cable, and first coupling means, being selectively operational to fixate the outer casing of the control cable in the second recess of the adapter element. The at least one seat of the lever and the at least one first recess of the housing may comprise first and second open spaces that may be aligned with each other in an assembly direction, which is perpendicular to the axial direction of the control cable, allowing for a simultaneous coupling of the first coupling element to the at least one seat and the adapter element to the at least one first recess of the housing, along said assembly direction.

This has the advantage that a control system is provided, which control system may be utilized for control over a mechanical function by means of the control cable. Said control cable may, due to the design defined herein, be very fast and easy to assemble and disassemble, due to the control cable and the accompanied adapter element being coupled to the seat of the lever and to the housing in a single direction. The control cable may thus not be bent and handled in complex ways for fitting thereof to the parts of the system. This provides a plurality of benefits, both for the system and its mechanical integrity and for a user who is using and assembling the system. One such benefit is that the lever may be securely positioned in a fixed manner, making alignment of the system in its entirety both faster and easier. The control cable does not need to be bent or flexed in complex ways as stated above, which alleviates the risk of damaging parts of said control cable, and thus in the long run increasing its longevity. Furthermore, as the assembly direction is from one side only, and also from in particular a side relative the housing, the system as a whole will be easier and faster to assemble, and compared to prior art, the housing does not need to be removed from wherever it is positioned, which is a common problem with said prior art. This provides a control cable that is much easier to assemble for a person using the control system, wherein time and costs are cut for maintenance work for the control system as a whole.

According to an aspect, the system may further comprise a second control cable, which may comprise the same features as the at least first control cable, the lever may comprise a second seat, wherein the first open space of the second seat being oriented perpendicular to the first open space of the at least one seat. The housing may comprise a second first recess, arranged to receive and hold the second control cable, wherein the second open space of the second first recess may be oriented perpendicular to the second open space of the first first recess. Such a configuration may thus allow for a simultaneous coupling of the adapter element of the second control cable to the second seat and the second adapter element of the second control cable to the second first recess, along a second assembly direction. The second assembly direction may be perpendicular to the assembly direction corresponding to the at least one control cable, and perpendicular to the axial direction of the control cable.

This has the advantage that the control system may comprise said two individual control cables, wherein both control cables are as easy to assemble to the housing and their respective seats of the lever. Furthermore, as will be understood throughout the disclosure, both said cables may be coupled to the housing and the lever in such a way that the lever may affect only one control cable if moved in a specific direction. Such an arrangement, defined by the design and assembly of the two control cables having perpendicular assembly directions towards the housing and respective seats may increase the benefit of having an easier and faster means of assembly.

According to an aspect, each adapter element may, when fitted to the housing, constitute a corner portion of the housing, which is rectangular shaped.

This has the advantage that the design of the housing may be modified in a versatile way. As each adapter constitutes a corner of said housing, each said adapter may be designed to enhance the mechanical integrity of the housing. As the corners of a mechanical structure often is subjected to more impacts and similar, due to their more exposed position, any corner having an adapter element therein may be made of a sturdier material for example. Thus, the remainder of the housing may be manufactured in a more lenient manner, as any adapter element being attached thereto may strengthen the structure, if said adapter element is made of a stronger material than the housing.

According to an aspect, each first coupling element of each control cable may be a ball joint, and each seat of the lever may comprise a cylindrical bore, wherein the first opening of said seat is an open side of said bore, and wherein a slit may be arranged in a sidewall of said bore, which slit is positioned between the seat and housing when the lever is in a natural position, and extending along the assemble direction of the seat.

This has the advantage that a coupling of such a ball joint to a seat having such a design will be very fast and easy to perform. The ball joint may simply be pushed into said bore, wherein the control cable attached thereto will be aligned with the slit in the correct direction towards the housing and a corresponding adapter element.

According to an aspect, each adapter element of each control cable may comprise at least one protrusion, extending in a plane perpendicular to the axial direction of its corresponding control cable. Each first recess of the housing may further comprise at least one hole, corresponding in shape with the at least one protrusion, wherein said protrusion and hole are configured to be form fitted with each other when the adapter element is coupled to the housing.

This has the advantage that each such adapter element will automatically be aligned in a correct manner when coupled to the housing along its intended assembly direction, and wherein the two elements being coupled together are configured to fit with each other in that specific arrangement, making coupling of the two very hard to perform wrong. Furthermore, as the protrusion and the hole are in a plane perpendicular to the axial direction of its corresponding control cable, the protrusion and hole will further assist in holding the outer casing of the control cable fixed relative the housing, in the axial direction of said control cable. Thus, such a control cable may securely move axially within its outer casing when pushed or pulled, wherein said casing is secured relative the housing in an effective manner.

According to an aspect, each coupling of an adapter element and a first recess may be provided with second coupling means, configured to selectively lock the adapter element in position in the first recess.

This has the advantage that each such adapter element may not only be fixed in its intended working direction, as in axially, but also be securely held in place in all directions relative the housing.

According to an aspect, the second coupling means may be configured for locking the adapter element to the outer casing of the control cable and to the housing simultaneously.

This has the advantage that a plurality of steps for assembly of the system may effectively be performed as a single step, which thus is both easier to perform and very time effective.

According to an aspect, each second recess is a through-hole, extending through the adapter element.

This has the advantage that such a hole may be designed to fit the outer casing of a control cable in a very precise manner, making for a very rigid and reliable assembly thereof.

According to an aspect, the lever may further comprise at least one input device of an auxiliary electrical system for operation of additional electrically operated functions.

This has the advantage that the use of the lever may be increased to be even more versatile and perform a plurality of functions with only one hand.

According to an aspect, the housing may further comprise an auxiliary recess, which is open towards a circumference of said housing, wherein the auxiliary recess is configured for receiving electrical wiring of the auxiliary electrical system so as to allow said wiring to pass through the housing.

This has the advantage that electrical wiring may be arranged to pass through the housing in a similar manner as any present control cable. This provides a synergy between any control cable and such electrical wiring, wherein both such devices to be arranged in such a housing may be provided to said housing in a lateral movement. The electrical wiring does thus not need to be inserted through a hole in the housing, which could prove difficult and cumbersome when performing installations and/or maintenance work to a control system.

According to an aspect, the mechanical function to be operated may be a valve to be controlled, wherein said valve may comprise a valve spool, which may be operable by means of an axial force thereto, the valve spool having a bore therein, said bore being configured for receiving an end of a control cable. The valve may further comprise an inner sleeve element having an externally threaded portion, and an outer sleeve element having an internally threaded portion, the inner and outer sleeve elements may further comprise opposite conical surfaces at end portions thereof, wherein said conical surfaces are configured to interact with each other when the threaded portions of the sleeve elements are engaged with each other. When interacting, the inner sleeve element may be pushed inwards so as to provide a clamping force to the casing of the control cable when inserted there through.

The control cable may further comprise a second coupling element, arranged at a second end section thereof, which second coupling element is configured to fit in the bore of the valve spool, the second coupling element and the bore may further comprise locking means for selectively locking thereof relative each other.

This has the advantage that the beneficial features of the control system relating to such a control cable being coupled to a housing and a lever may be coupled with an effective and easy to perform coupling to a valve according to above. Coupling of the second end section of the control cable is easily performed in a single direction with regards to the insertion of said second end section of said control cable, wherein the control cable is locked with the locking means, and the casing is locked be means of the threaded coupling between the two sleeve elements. The control cable of the control system may thus be easily coupled to both a lever for operation, and a valve spool to be operated in a very fast manner, wherein initial assembly and any maintenance work performed to the control system according to the disclosure is both cost and time effective.

According to an aspect, the locking means of the bore and the second coupling element may be comprised of a circumferential slit arranged at the second coupling element, and a hole arranged in a sidewall to the bore, which hole and slit may be arranged to align when the control cable is fully inserted into the bore. The hole may further be configured for receiving a screw therein, which screw extends into the slit of the second coupling element when screwed into the hole.

This has the advantage that the control cable may be securely fixated to the bore of the valve spool in a very simple manner, only needing a single screw to be tightened to achieve said fixating.

According to an aspect, the inner sleeve element may further comprise a hole, which is aligned with the hole of the sidewall of the bore, for allowing operation of the screw. The inner and outer sleeve elements may be configured in such a way that, when the outer sleeve element is fully threaded to the inner sleeve element, the outer sleeve element covers the hole in the inner sleeve element.

This has the advantage that a plurality of functions relating to coupling of the valve spool and the control cable are aligned in such a manner that they complete each other with regards to their functionality, and also forces a user of the system to perform an assembly thereof in a specific order, which is deemed as the most suitable order of action for ending up with a calibrated control system when the assembly is done.

According to an aspect, an adapter element for coupling of a control cable to a housing of a control system is provided. The adapter element may comprising a body with a second recess therein, which may be configured for receiving an outer casing of a control cable, and first coupling means, being selectively operational to fixate the outer casing of the control cable in the second recess of the adapter element. The adapter element may be configured to be form fitted into a first recess of a housing of the control system according to the disclosure, wherein the adapter element and the first recess, when form fitted with each other, locks the adapter element relative the housing in a direction parallel with the axial direction of the control cable.

This has the advantage that an adapter element is provided, which adapter element may be utilized to adapt a control cable to be used with a control system according to the disclosure herein.

According to an aspect, a control cable for translation of mechanical energy from a lever to a mechanical function is provided. The control cable may comprise a first coupling element, arranged at a first end of said control cable, and an outer casing, axially movable relative said control cable. The control cable may further comprise an adapter element according to the disclosure, arranged at the outer casing of the control cable.

This has the advantage that a control cable, already provided with an adapter element, is provided. Such a control cable with an adapter element arranged thereto may thus be readily available for a control system according to the disclosure, when such a system needs maintenance with regards to its cables therein.

BRIEF DESCRIPTION OF THE DRAWINGS

Below is a description of, as examples, embodiments with reference to the enclosed drawings, in which:

FIGS. 2a-d show adapter elements coupled to housings of control systems, according to different embodiments.

DETAILED DESCRIPTION

The description of the various features, and modifications thereof, according to the disclosure will herein be described in more detail. It is thus to be understood that embodiments comprising any of the described feature or a combination of features may be assembled in accordance with the description herein.

Figure 1:
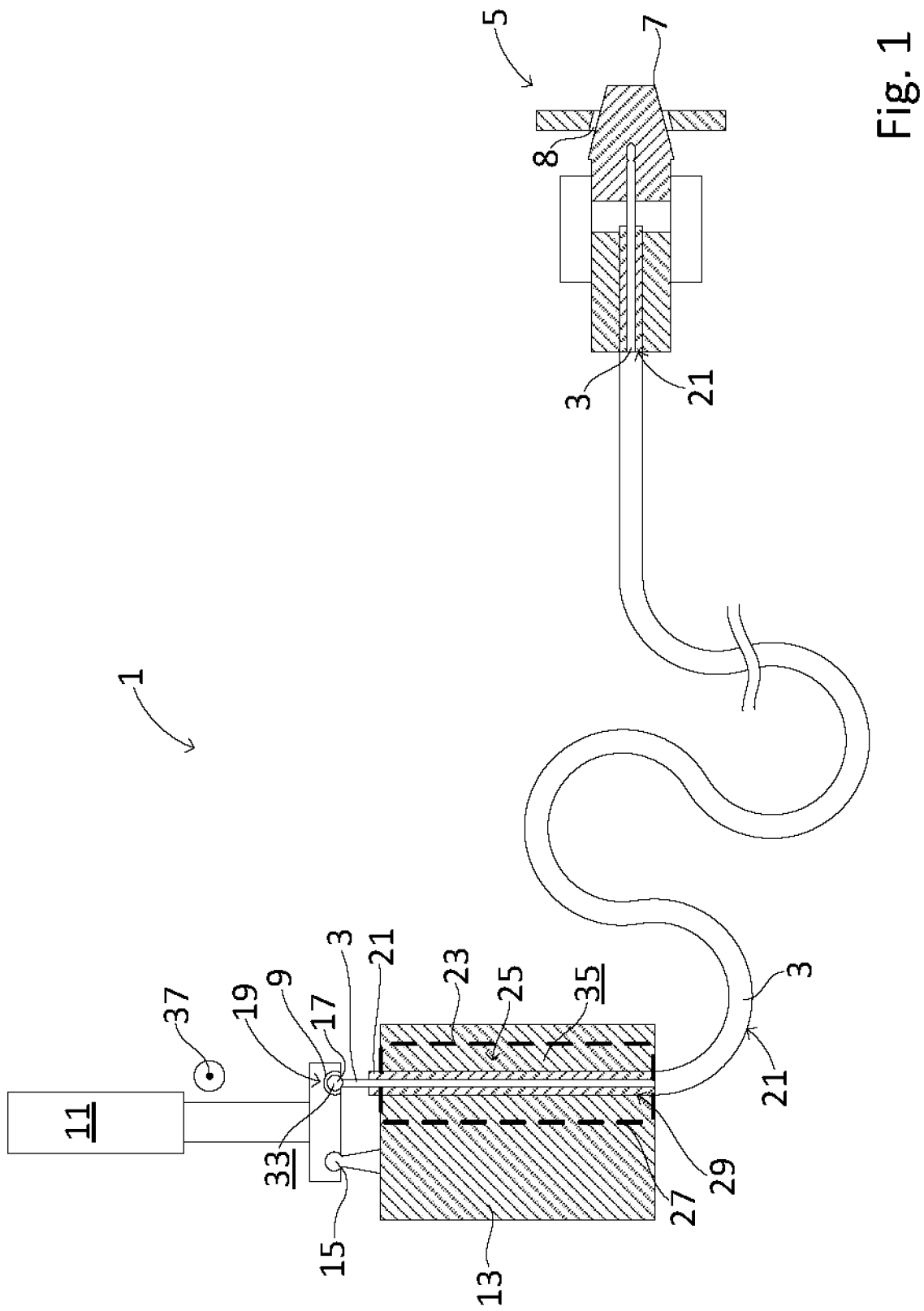
FIG. 1 shows a schematic illustration of a control system using a control cable, according an embodiment.

FIG. 1 shows a schematic illustration of a control system 1 using a control cable 3, according to an embodiment. The control system 1 depicted herein is to be perceived as a system for operating a mechanical function, which function utilizes a mechanical force in some manner. In this example said mechanical function is to be viewed as opening or closing of a valve 5, wherein a translating movement of the control cable 3 shifts a position of a spindle 7 relative a seat 8 of said valve 5. However, as should be obvious, a plurality of concepts in the disclosure may readily be used for a large variety of other mechanical functions without deviating from the scope of protection defined throughout the disclosure herein. Furthermore, the valve 5 depicted in FIG. 1 is to be viewed as a schematic representation and not a limiting embodiment, the control cable 3 may in similar ways be coupled to other parts of other types of valves, such as being coupled to stems, spools, seats, discs, balls or other. An embodiment of the inventive concept of the control system 1 being used to control a valve spool of a valve will be described later in the disclosure, with reference to FIG. 5.

The control system 1 may comprise a lever 11, or another type of input device, a housing 13, and at least one control cable 3. The lever 11 may be pivotable in at least one direction about a pivot point 15 and may comprise at least one seat 9 for receiving a first coupling element 17 of the at least one control cable 3. The lever 11 may, as depicted in FIG. 1, be pivotable so that such a pivoting movement of the lever 11 either lowers or raises the seat 9 relative the housing 13, wherein the first coupling element 17 and thus in turn the control cable 3 follows the up and down movement of the seat 9, which provides the translation of mechanical energy from the lever 11 to said control cable 3. The control cable 3 may comprise said first coupling element 17, arranged at a first end 19 thereof, and an outer casing 21, axially movable relative said control cable 3. The housing 13 may comprise said pivot point 15, and may be configured for receiving the at least one control cable 3 and to hold the outer casing 21 of said control cable 3 in a fixed position. Thus, when assembled, a pivoting movement of the lever 11 may move the control cable 3 axially relative the housing 13 and the outer casing 21 of the control cable 3, which axial movement of the control cable 3 is utilized for performing said mechanical function (in this example opening or closing of the valve 5).

The control system 1 may further comprise at least one adapter element 23, and the housing 13 may further comprise at least one first recess 25, configured for receiving and holding said adapter element 23. The at least one adapter element 23 and the at least one first recess 25 may be form fitted with each other when coupled, which coupling may lock the adapter element 23 relative the housing 13 in a direction parallel with the axial extending direction of the control cable 3. Herein it should be mentioned that the phrasing "in a direction parallel with the axial direction of the control cable" refers to the extension of the control cable 3 within the housing 13.

The adapter element 23, which will be described in more detail within the upcoming disclosure, may comprise a body 27 with a second recess 29 therein, which second recess 29 being configured for receiving the outer casing 21 of the control cable 3, and first coupling means 31 (not visible in FIG. 1), being selectively operational to fixate the outer casing 21 of the control cable 3 in the second recess 29 of the adapter element 23. Thus, instead of coupling the control cable 3 and its outer casing 21 directly to the housing 13, the adapter element 23 may be used as an intermediate coupling device. This provides a plurality of benefits for the control system 1, which, as will be understood, becomes much faster and easier to use, assemble and disassemble with regards to the coupling of the control cable 3 to the housing 13 and thus the system 1.

Certain features of the adapter element 23 are not easily viewed in FIG. 1, and will be disclosed in more detail with reference to later figures, as mentioned previously, but said features are briefly mentioned herein so as to provide a basic understanding of the inventive concept relating to the adapter element 23 and its function.

The at least one seat 9 of the lever 11 and the at least one first recess 25 of the housing 13 may comprise first and second open spaces 33, 35 that are aligned with each other in an assembly direction 37, which is perpendicular to the axial extending direction of the control cable 3. In FIG. 1, this assembly direction 37 is to be perceived as the viewing direction of the drawing, wherein features relating to the assembly direction 37 may be easier to grasp fully later on in the disclosure. The first and second open spaces 33, 35, which are in front of the seat 9 and the housing 13 when viewing FIG. 1, may allow for a simultaneous coupling of the first coupling element 17 to the at least one seat 9 and the adapter element 23 to the at least one first recess 25 of the housing 13, along said assembly direction 37. This alleviates several issues when it comes to installing and replacing the control cable 3 in the system 1. As is seen in FIG. 1, the adapter element 23 is herein depicted with dashed lines, wherein if said adapter element 23 would be removed from the drawing, a somewhat representative presentation of prior art would be obtained. There are of course variations of prior art and its attempts at solutions for solving issues relating to the aforementioned instalment and replacement of such a control cable 3, wherein such problems arise due to a rather complex general design of system similar to the one depicted in FIG. 1. If the housing 13 is perceived as only comprising a through-hole in which the control cable 3 is inserted and then fixated, it is obvious that such a control cable 3 needs to be inserted along said through-hole in its axial direction. However, as the control cable 3 is designed to transfer mechanical energy along the same axial direction, it may not be preferable to also insert the first coupling element 17 of said cable in the same axial direction, as such a coupling will be subjected to forces in the same direction. Thus, the coupling of the control cable 3 to the seat 9 of the lever 11 is preferably achieved be a coupling in a direction transversal to the axial direction of said cable 3. With one cable 3 requiring coupling in a plurality of directions (such as first inserting it along the axial direction, and then bending it to move around and then into the seat), such a task becomes more difficult to perform, and the cable 3 may be exposed to bending, twisting and turning in a way that in a worst case scenario may deteriorate the mechanical integrity of said cable 3. Furthermore, for certain applications using a control system 3 like, or similar, to the one described herein, such as heavy working vehicles having such control systems 1, space around the housing 13 when assembled therein may be limited, wherein an as simple assembly operation as possible is beneficial. If a control cable 3 needs to be subjected to actions and/or forces from a plurality of directions for assembly thereof in such a vehicle, the housing 13 often needs to be removed so as to perform the coupling of the cable 3 to the housing 13 first, and then re-assemble the housing 13 to the vehicle.

The problems that may arise as described above may thus be alleviated in a plurality of ways by means of using an adapter element 23 according to the disclosure, wherein coupling of a control cable 3 by means of such an adapter element 23 used as an intermediate device is highly beneficial with regards to a plurality of aspects. Assembly of the system 1 is made easier, especially for the end user, which makes the system 1 more attractive as a whole for said user. As the installation, assembly and maintenance may be performed from one direction, the housing 13 of the system 1 may be installed and coupled to exterior structures and/or in more hard to reach places, without the need to disassemble said housing 13 for installing or replacing a control cable 3 therein.

The adapter element 23, variations thereof and its varying features will herein be disclosed with reference to FIGS. 2a-d. FIGS. 2a-d show adapter elements 23 coupled to housings 13 of control systems 1, according to different embodiments. All adapter elements 23 and housings 13 shown in said figs. are seen as cross sectional views taken in planes perpendicular to the extension of the control cables 3 in said housings 13. Some details and features are the same for all FIGS. 2a-d and will be addressed first, whereas other details and features may vary, and will be described in detail with reference to the individual figure in which said specific details are shown.

As is shown in all FIGS. 2a-d, the control system 1 may further comprise a second control cable 3, which may comprises the same features as the at least first control cable 3, the lever 11 may correspondingly comprise a second seat (not seen in FIGS. 2a-d), the first open space 33 of the second seat being oriented perpendicular to the first open space 33 of the at least one seat.

The housing 13 may comprise a second first recess 25, which may be arranged to receive and hold the second control cable 3, wherein the second open space 35 of the second first recess 25 may be oriented perpendicular to the second open space 35 of the first first recess 25, allowing for a simultaneous coupling of the adapter element 23 of the second control cable 3 to the second seat and the second adapter element 23 of the second control cable 3 to the second first recess 25, along a second assembly direction 37, which is perpendicular to the assembly direction 37 corresponding to the at least one control cable 3, and extending in a plane that is perpendicular to the axial direction of the said control cable 3. The two individual sets of control cables 3, arranged in the housing 13 by means of their individual adapter elements 23 may function as described above individually without affecting each other. The pivoting directions for each of the two control cables 3 may be arranged to be perpendicular to each other, wherein a rotation about a first rotational axis 39 shift a height of the first seat, but does not shift a height of the second seat, with respect to the housing. Correspondingly, rotation about a second rotational axis 41 shift the height of the second seat, but does not shift the height of the first seat, with respect to the housing 13. Thus, the two sets of control cables 3 and their adapter elements 23 function individually. The control system 1 may of course still comprise only one control cable 3, and it may also comprise a larger plurality of control cables 3 each being coupled to the housing 13 with adapter elements 23, if movement of said larger plurality of control cables 3 do not have a negative impact on each other.

As is further seen in FIGS. 2a-d, all adapter elements 23 are herein positioned at corners of the housings 13. As is seen in FIG. 1, this may not always be required, but it may provide benefits to the system 1 as a whole. Such corner positions may be manufactured with a stronger and more durable material for example, as the adapter elements 23 constituting the corners may strengthen the mechanical structure without the need for a stronger material for the entire housing 13. Furthermore, if an adapter element 23 is positioned at a corner of the housing 13, the assembly direction may be modified so as to approach the housing 13 from any of the sides joined at said corner.

All FIGS. 2a-d also share the feature that each adapter element 23 of each control cable 3 may comprise at least one protrusion 43, extending in a plane perpendicular to the axial direction of its corresponding control cable 3, away from the adapter element 23. Each first recess 25 of the housing 13 may thus further comprise at least one hole 45, corresponding in shape with the at least one protrusion 43, wherein said protrusion 43 and hole 45 are configured to be form fitted with each other when the adapter element 23 is coupled to the housing 13. The different embodiments of the adapter element 23 as shown in FIGS. 2a-d are as seen different in this regards, as some adapter elements 23 comprise one such protrusion 43 and hole 45, and some comprise several of said pair each. This may, as should be realized, be varied in a variety of ways to customize a control system 1 to be as suitable as possible for different types of adjacent devices and machinery. The protrusions 43 and holes 45 shown herein are also to be perceived as schematic in nature, wherein their exact design, shape and size may vary without deviating from the scope of protection. The combination of said protrusions 43 and holes 45 are configured to lock the adapter elements 23 in a direction parallel to the axial direction of the control cables 3, so that the control cables 3 are fixed firmly in their correct positions within the housing 13.

Turning the attention to FIG. 2a specifically, it may be noted that the embodiment depicted therein comprises a housing 13 having two adapter elements 23 arranged therein, each adapter element 23 being situated in a first recess 25 of said housing 13. Each of the two adapter elements 23 according to this embodiment comprises one protrusion 43 each, wherein the housing 13 thus also comprises two corresponding holes 45 configured for receiving and holding said protrusions 43. Furthermore, each adapter element 23, as depicted herein, may comprise a second recess 29 each, wherein said second recess 29 may be shaped as a channel, extending from a circumference of said adapter element 23 and reaching into a desired position for the control cables 3 to be situated. This allows for fragmenting the coupling of the housing 13, adapter element 23 and the control cable 3 if desired, wherein the control cable 3 may be positioned in its respective seat first, and then attaching the adapter element 23 to the housing 13 and the control cable 3, wherein the adapter element 23 and the control cable 3 both are coupled along the assembly direction, but done as separate steps. The housing 13 may, as depicted, further comprise an auxiliary protrusion 47, arranged to extend into the channel, and be configured to abut the outer casing 21 of the control cable 3. Said auxiliary protrusion 47 and the adapter element 23 may then together provide a pressing force to the control cable 3, so that the outer casing 21 sits firmly fixated in the channel shaped second recess 29. The adapter element 23 in general, or the protrusion 43 thereof specifically, may further be provided with form fitted snap locking means, configured to lock the adapter element 23 to the first recess 25 of the housing 13 when the two are coupled together. This provides a fast and easy coupling that may be performed without the need for any external tools.

FIG. 2b shows a similar cross sectional view of a housing 13 with two adapter elements 23 attached thereto. The adapter elements 23 according to this embodiment are slightly different compared to the ones depicted with reference to FIG. 2a. Firstly, each second recess 29 of each adapter element 23 may be a through-hole, extending through the adapter element 23. The control cables 3 will thus need to be inserted through said through-holes when being coupled to the adapter elements 23, before the adapter elements 23 are coupled to the housing 13 of the control system 1. The adapter elements 23 may further comprise at least in part a material and/or design that allows for applying a pressing force to the outside of the adapter element 23 so as to deform the through-holes enough to hold the outer casing 21 of the control cables 3 in fixed positions in the adapter elements 23.

Each adapter element 23 may also further comprise two protrusions 43 each, extending out from said adapter elements 23 at separate angles therefrom. Having a plurality of such protrusions 43, which are fitted into a corresponding shape of their respective first recesses 25 in the housing 13, may provide an even sturdier and secure attachment of the adapter elements 23 to the housing 13. As is depicted by means of the protrusion 43 illustrated by the dotted lines, the adapter element 23 may also as an alternative, comprise such protrusions 43 having different shapes and/or sizes. Such a solution makes it more difficult, or even impossible to connect the adapter element 23 in the wrong position and/or orientation at the housing 13, which provides an even more user-friendly solution for the end user of such a control system 1.

FIG. 2c shows a cross sectional view of a housing 13 with two adapter elements 23 attached thereto, similar to the one depicted with reference to FIG. 2b. A shared feature between the two embodiments is that each second recess 29 is a through-hole, extending through the adapter element 23. Both adapter elements 23 also share the feature of being provided with a plurality of protrusions 43, extending from the adapter element 23, perpendicular relative each other. The adapter element 23 according to FIG. 2c may further comprise second coupling means 49, wherein each coupling of an adapter element 23 and a first recess 25 may be provided with said second coupling means 49, which are configured to selectively lock the adapter element 23 in position in the first recess 25. The schematic second locking means 49 as presented in FIG. 2c may be perceived as a screw, configured to be inserted into pre-drilled holes of the adapter element 23 and the housing 13, which holes are aligned with each other when the adapter element 23 is in its proper positioning relative the housing 13. The second coupling means 49 may of course be designed in other manners as well, and is not restricted to be in the form of a screw, but may be other alternative fastening means and/or elements as well.

FIG. 2d shows an alternative embodiment of the housing 13 and adapter elements 23 according to FIG. 2c, wherein for the adapter elements 23 according to FIG. 2d, the second coupling means 49 may be configured for locking the adapter element 23 to the outer casing 21 of the control cable 3 and to the housing 13 simultaneously. This may be achieved by designing the adapter element 23 to be susceptible to be compressed when a fastener such as a screw is inserted through the adapter element 23 and into a threaded hole in the housing 13. The adapter element 23 may then further for example, as depicted in FIG. 2d, comprise a slit 51, extending from the second recess 29, wherein the adapter element 23 will close said slit 51 and push an inner circumference of the second recess 29 inwards, which pushes against the outer casing 21 of the control cable 3 so as to hold it in place therein.

As should be obvious, the various embodiments of the adapter element 23 and the corresponding housing 13, as illustrated in FIGS. 2a-d, may be altered in various ways on a detail level without deviating from the scope of protection. They all however provide the advantage of being able to couple a control cable 3 to a housing 13 of a control system 1 in a fast and easy manner, wherein the housing 13 never needs to be approached from below or above, but instead strictly from a side of said housing 13. A more complete control system 1 will now be shown and explained with reference to FIG. 3, wherein the advantage of such an approach may become more intuitive.

Figure 3:
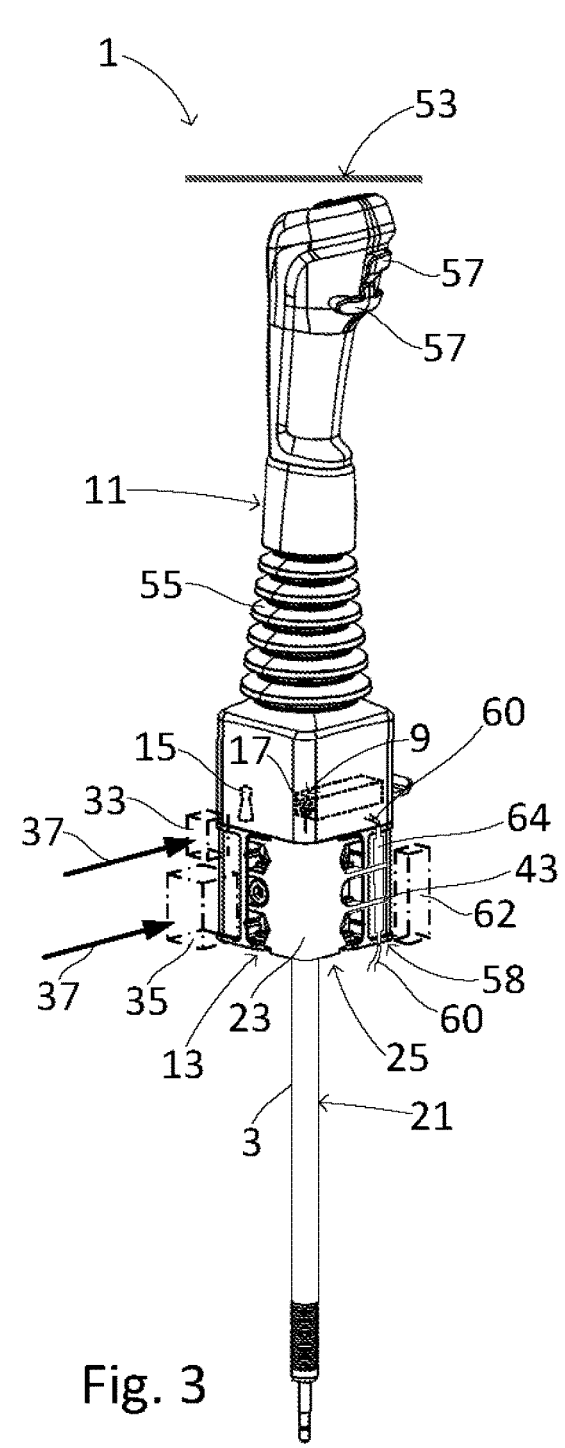
FIG. 3 shows a control system using in a perspective view, according an embodiment.

FIG. 3 shows a control system 1 in a perspective view, according an embodiment. The control system 1 may be used for operating a mechanical function, such as for example opening and closing of a valve or similar. The control system 1 may comprising a lever 11, which herein is coupled to and hidden by a joystick 53 to be used as control input. The system 1 further comprise a housing 13 and at least one control cable 3. The control system 1 shown in FIG. 3 is shown to be equipped with just one control cable 3, but it may or may not comprise additional features at the back portion of the housing 13 so as to be able to accommodate a second control cable 3. The lever 11 may be pivotable in at least one direction about a pivot point 15 and may comprise at least one seat 9 for receiving a first coupling element 17 of the at least one control cable 3. The seat 9, pivot point 15 and the first coupling element 17 are illustrated in dotted lines in FIG. 3, due to the joystick 53 comprising a bellows 55, which covers the seat 9 and adjacent elements/devices at the top of the housing 13. It should here be noted that such a bellows 55 may be designed to extend even further down over the housing 13 as well. Thus, it may be configured to extend over the entirety of the housing 13 and any adapter elements 23 coupled thereto. By means of using such a longer extending bellows 55, any present adapter element 23 may be at least somewhat held in its correct lateral position by means of the bellows 55 holding it in place towards the housing 13.

The control cable 3 may comprise an outer casing 21, which is axially movable relative the internally positioned control cable 3. A pivoting movement of the joystick 53, and correspondingly the lever 11, will thus move the control cable 3 axially relative the housing 13 and the outer casing 21 of the control cable 3, when the outer casing 21 of the control cable 3 is fixated in the adapter element 23. Such axial movement of the control cable 3 may then be utilized for performing said mechanical function, such as opening or closing of a valve, by means of the corresponding movement of a second coupling element, arranged at a second end section of the control cable. The second end of the control cable 3, and its coupling to a mechanical function will be explained in more detail with reference to FIG. 5.

The at least one seat 9 of the lever 11 and the at least one first recess 25 of the housing 13 may comprise first and second open spaces 33, 35 that are aligned with each other in an assembly direction 37, which is perpendicular to the axial direction of the control cable 3. This may allow for a simultaneous coupling of the first coupling element 17 to the at least one seat 9 and the adapter element 23 to the at least one first recess 25 of the housing 13, along said assembly direction 37, as previously described. The control system 1 as depicted in FIG. 3 may be perceived as a system to be installed in a heavy vehicle or similar, wherein it should be obvious that the housing 13 is attached in said vehicle, in a control both or similar. By means of installing the control cable 3 in the assembly direction as shown, the housing 13 may be installed in such a vehicle without taking into consideration that said housing 13 needs to have free and open spaces below the base of said housing 13, as the control cable 3 does not need to be inserted into the housing 13 from underneath.

The lever 11 of the control system 1 may further comprise at least one input device of an auxiliary electrical system for operation of additional electrically operated functions. Such input devices are shown in FIG. 3, in the form of two buttons 57 arranged at the top of the joystick 53. The buttons 57 may be connected to electrical wiring that may be arranged underneath the bellows 55 and adjacent the lever 11, wherein said wiring may be attached in the housing 13 of the control system 1, and then finally extending therefrom to their intended location. The housing 13 may further comprise an auxiliary recess 58, which is open towards a circumference of said housing, wherein the auxiliary recess 58 is configured for receiving electrical wiring 60 of the auxiliary electrical system so as to allow said wiring 60 to pass through the housing 13. In a similar manner to the concept of the adapter element 23 being coupled to the housing 13 in a lateral movement due to the design comprising an open space 35 adjacent said housing 13, the auxiliary recess 58 may be provided with an adjacent third open space 62, being positioned outside of said recess 58 relative the housing 13, and thus allowing for a sideways positioning of the wiring 60 within the housing 13.

The electrical wiring 60 may be arranged directly into the auxiliary recess 58, wherein said recess 58 may be configured for receiving, and also holding said wiring in place axially. This may be achieved by means of, for example, providing the recess 58 with at least one S-shape through which the wiring will have a hard time sliding out of. This may be coupled with an addition of a plurality of inwards oriented projections that assist in holding said wiring in place.

The wiring 60 may also be provided with an auxiliary adapter element 64, which is configured for holding the wiring 60. The auxiliary recess 58 may for such a case be configured to be form fitted with said auxiliary adapter element 64, wherein their functionality mirrors that of the second recess 25 and the adapter element 23. Synergic effects may also be provided to a control system 1 comprising a combination of these features. One such example is depicted in FIG. 3, wherein the two middle protrusions 43 of the adapter element 23 are extended further so as to fit in corresponding slits or recesses in the auxiliary adapter element 64. This assists in holding said auxiliary adapter element 64 in its proper position. The opposite is also possible, wherein the extending protrusions 43 may be provided with some type of hollows, holes, recesses or slits, in which the auxiliary adapter element 58 fits so as to lock the elements together when said auxiliary adapter element 64 is arranged in the auxiliary recess 58.

Adding such additional electrical features to a control system 1 according to the disclosure may be performed with more ease due to the inventive concept of the adapter elements 23 and their way of being coupled to the housing 13. As a lot of prior art solutions for similar control systems requires the housing 13 to be detached from where it is used, additional electrical wiring may add an additional inconvenience for such an operation. Thus, by means of the benefits of the adapter elements 23 and their inventive coupling to the control system 1, other non-obvious advantages may be achieved as well, such as the one described herein.

Figure 4:
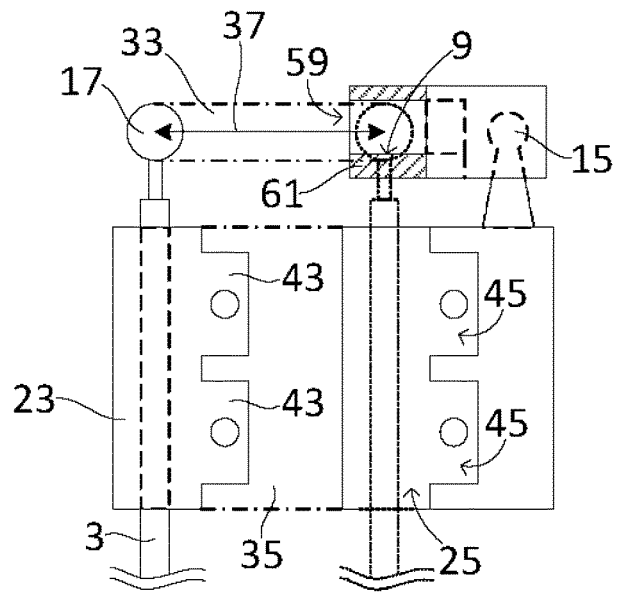
FIG. 4 shows a schematic close-up of a control cable with an adapter element and a housing coupled to a seat, according to an embodiment.

FIG. 4 shows a schematic close-up of a control cable 3 with an adapter element 23 and a housing 13 coupled to a seat 9. This illustration may in a clearer manner show how a coupling between a control cable 3 having an adapter element 23 arranged thereto may be simultaneously coupled to a seat 9 and a housing 13 having a first recess therein 25, according to a control system 1 as defined throughout the disclosure. The control cable 3 is herein provided with an adapter element 23 having two parallel protrusions 43 extending therefrom, wherein the shape of said adapter element 23 and protrusions 43 is mirrored by the first recess 25 and two corresponding holes 45 arranged in the adjacent housing 13. Said housing 13 further comprises the pivot point 15, to which a seat 9 is arranged for receiving the first coupling element 17 of the control cable 3. The seat 9 is herein comprised of a cylindrical bore 59 having a slit 61 arranged in a sidewall of said bore 59, namely the sidewall being positioned between the seat 9 and the housing 13. The first coupling element 17 is herein a ball joint, configured for fitting in the seat 9 in the form of the cylindrical bore 59. As is further seen in FIG. 4, the first and second open spaces 33, 35 are herein entirely free from objects, elements or devices that could disturb a coupling of the control cable 3 to the housing 13, and the ball joint 17 to the seat 9. This thus allows for completely lateral sideways movement along the assembly direction 37, which is perpendicular to the axial extending direction of the control cable 3. As the ball joint 17 cannot be shifted out from the seat 9 in said axial direction, and the protrusions 43 of the adapter element 23 being arranged in the corresponding holes 45 of the first recess 25 and the housing 13 hinders said adapter element 23 to be shifted out from said first recess 25 in said axial direction, only one such lateral coupling movement is needed to achieve a functioning coupling of said elements for the control system 1.

Figure 5:
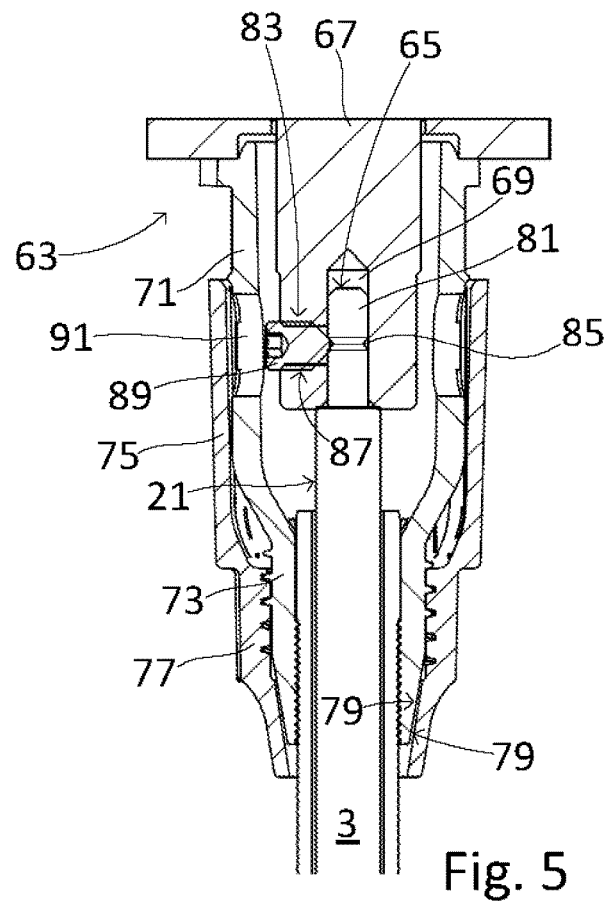
FIG. 5 shows a cross section of a mechanical function in the form of a valve, coupled to a control cable, according an embodiment.

FIG. 5 shows a cross section of a mechanical function in the form of a valve 63, coupled to the second end section 65 of a control cable 3 of a control system 1. The second end 65 of the control cable 3 may be perceived as the second end shown in FIG. 3, or similar. The mechanical function to be operated is thus as mentioned a valve 63 to be opened or closed, wherein said valve 63 comprises a valve spool 67, which is operable by means of an axial force acting thereto. The valve spool 67 may have a bore 69 therein, said bore 69 being configured for receiving the second end section 65 of the control cable 3, an inner sleeve element 71 having an externally threaded portion 73, and an outer sleeve element 75 having an internally threaded portion 77. The inner and outer sleeve elements 71, 75 may further comprise opposite conical surfaces 79 at end portions thereof, wherein said conical surfaces 79 are configured to interact with each other when the threaded portions 73, 77 of the sleeve elements 71, 75 are engaged with each other. The inner sleeve element 71 may be pushed inwards so as to provide a clamping force to the outer casing 21 of the control cable 3 when it is inserted there through. Thereby the outer casing 21 of the control cable 3 is securely fixated to the outer portions of the valve 63, not affecting the internally situated control cable 3 nor the spool 67 of said valve 63.

The control cable 3 may further comprise a second coupling element 81, arranged at a second end section 65 thereof, which second coupling element 81 is configured to fit in the bore 69 of the valve spool 67. The second coupling element 81 and the bore 69 may further comprise locking means 83 for selectively locking thereof, relative each other. Such locking means 83 may thus, when securely locked simultaneously as the first end of the control cable 3 is locked to the seat and housing, readily be used to transfer mechanical energy from movement of the lever to the spool 67 of the valve 63. The locking means 83 of the bore 69 and the second coupling element 81 may be comprised of a circumferential slit 85, arranged at the second coupling element 81. The second coupling element 81 may be a rigid metal cylinder or similar, wherein such a slit 85 easily may be provided to the circumference of such a cylinder. The locking means 83 may further comprise a hole 87 arranged in a sidewall to the bore 69, which hole 87 and slit 85 may be arranged and configured to align when the control cable is inserted into the bore 69. The hole 87 may then further be configured for receiving a screw 89 therein, which screw 89 extends into the slit 85 of the second coupling element 81 when screwed into the hole 87. Preferably, the screw 89 comprises a tip that is configured to fit in the slit in such a way that the slit 85 and the tip of the screw 89 automatically are centred relative each other when fitted together and the screw 89 is tightened. This may easily be achieved by means of said tip being conically shaped, and the slit 85 being provided into the second coupling element 81 in the form of a triangular shaped recess, which triangular shape corresponds to an angle of the tip of the screw 89.

The inner sleeve element 71 may further comprise a hole 91, which may be aligned with the hole 87 of the sidewall of the bore 69, for allowing operation of the screw 89, and the inner and outer sleeve elements 71, 75 may be configured in such a way that, when the outer sleeve element 75 is fully threaded to the inner sleeve element 71, the outer sleeve element 75 covers the hole 91 in the inner sleeve element 71. The hole 91 in the inner sleeve element 71 may be provided in said inner sleeve element 71 at a position that corresponds to a predetermined position that the spool 67 will be in when the valve 63 is in a corresponding predetermined state. For example, if the spool 67 is in a neutral state, which may correspond to the valve being in a specific state, the hole 87 in the sidewall of the bore 69 may then be arranged in a centre of the hole 91 in the inner sleeve element 71. An operator of the control system may then automatically know the state of the valve 63 when coupling a control cable 3 thereto. This may be combined with the coupling of the first end of the control cable 3 so as to provide a control system 1 that does not need any calibration when installed or if a control cable 3 is replaced. The lever of the control system 1 may be provided with a locking feature, which feature may be used to lock the lever in its position when the at least one seat thereof is in a known neutral position. The hole 87 in the sidewall of the bore 69 may then be arranged to said bore 69 in a position that corresponds to the state the spool 67 should be in when the lever and the seat is in said neutral position. By means of aligning the hole 87 in the sidewall of the bore 69 with the hole 91 of the inner sleeve element 71 at a manufacturing stage, the control system 1 will automatically be calibrated correctly if installed properly, with a clearly visible indication of error being provided to an operator, in that the two said holes 87, 91 are not aligned if so.

The inner and outer sleeve elements 71, 75 being threaded in opposite facing directions provides an easy method of engaging the two elements 71, 75 together and locking them in position. The inner sleeve element 71 may be configured to be deformed to some extent so as to be pushed inwards so as to abut the outer casing 21 of the control cable 3. Said inner sleeve element 71 may thus be made of a flexible material, so that the inner sleeve element 71 springs back to its outer shape when the threaded coupling is disengaged. The inner sleeve element 71 may preferably also be made with a plurality of slits in its circumference, so that a diameter thereof easier may be deformed and/or altered due to the inward directed force from the outer sleeve element 75. The second coupling element 81 is first fixated to the spool 67 of the valve 63, wherein the two sleeve elements 71, 75 are threaded together after said coupling is achieved in a secure manner. When the two sleeve elements 71, 75 are fully threaded together, the inner sleeve element 71 may be tightly pushed inwards towards the outer casing 21 of the control cable 3, while at the same time the outer sleeve element 75 is moved by means of the threaded connection so that the outer sleeve element 75 cover the hole 91 in the inner sleeve element 71. This provides a closed connection to the valve 63, which prevents dust, dirt and other debris to enter said hole 91 in the inner sleeve element 71.

Figure 6:
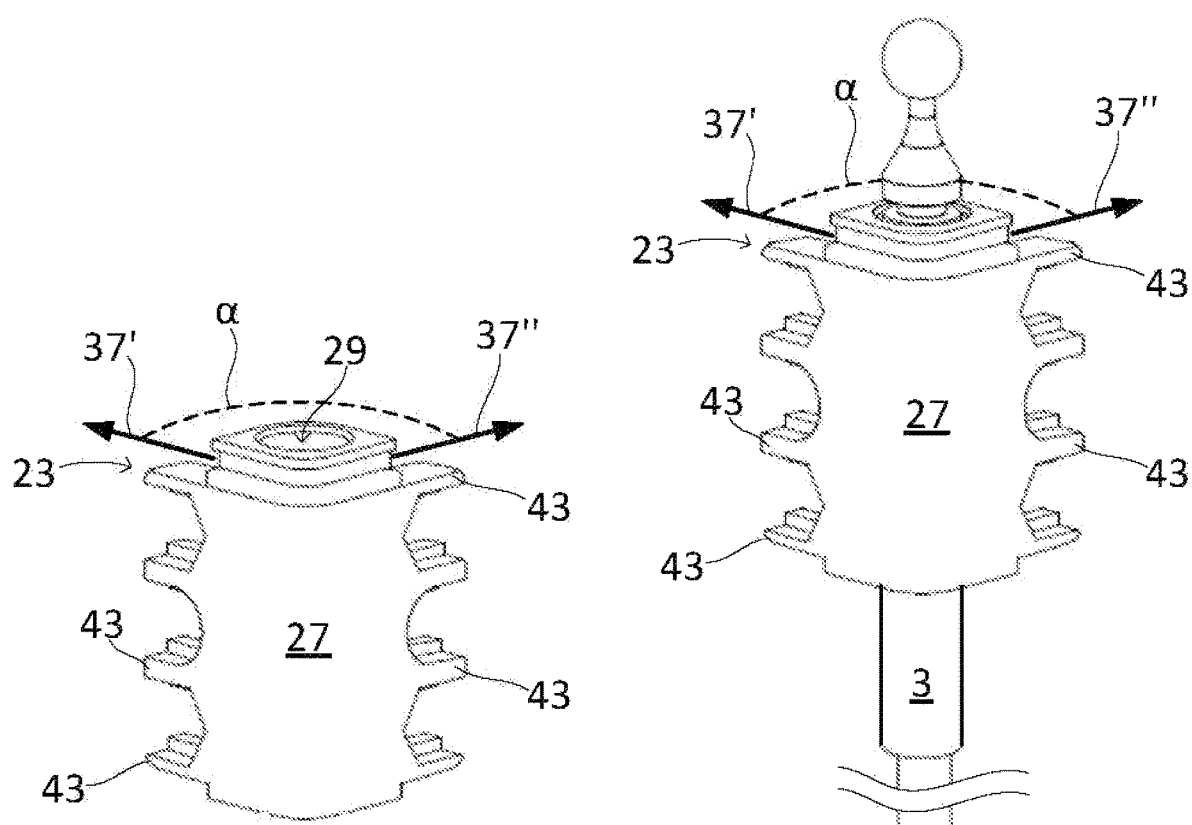
FIG. 6 shows an adapter element for coupling a control cable to a housing of a control system, according to an embodiment.

FIG. 6 shows an adapter element 23 for assisting coupling of a control cable 3 to a housing 13 of a control system 1. The adapter element 23 may comprise a body 27 with a second recess 29 therein, which is configured for receiving an outer casing 21 of a control cable 3. The second recess 29 may, as depicted herein, be a through-hole extending through the length of the body 27, but may be shaped in other various forms as shown and explained within the disclosure. The adapter element 23 may further comprise first coupling means 31, which may be selectively operational to fixate the outer casing 21 of the control cable 3 in the second recess 29 of the adapter element 23. The adapter element 23 as depicted herein may be perceived as being made from a sufficiently ductile material, wherein the adapter element 23 may be squeezed from the outside so as to be deformed inwards and hold a control cable 3 therein, by means of the inner circumference of the second recess 29 being pushed towards the outer casing 21 of the control cable 3. The adapter element 23 may further be configured to be form fitted into a first recess 25 of a housing 13 according to the disclosure. The adapter element 23 and the first recess 25, when form fitted with each other, may lock the adapter element 23 relative the housing 13 in a direction parallel with the axial extending direction of the control cable 3. The shape of the adapter element 23 depicted in FIG. 6 is seen to comprise a plurality of protrusions 43, extending in perpendicular directions from corners of the adapter element 23. In between the protrusions 43, additional fasteners and/or coupling elements may readily be arranged to be connected to the housing 13 and hold the adapter element 23 fixated in its place within the first recess 25 of the housing 13. The assembly direction 37 relating to an adapter element 23 of this design may vary within an angular range a, spanning between a first assembly direction 37' and a second assembly direction 37" as shown in FIG. 6. The adapter element 23 shown in FIG. 6 can, as should be obvious, be altered and modified according to its individual features and their variations as explained throughout the disclosure.

Figure 7:
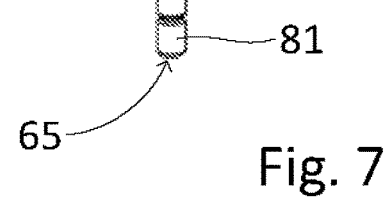
FIG. 7 shows a control cable with an adapter element arranged thereto, according to an embodiment.

FIG. 7 shows a control cable 3 with an adapter element 23 arranged thereto, according to an embodiment. The control cable 3 may be provided with such an adapter element 23, which may be securely fastened thereto, prior to being provided to an end user of a control system of which it is to be comprised. The control cable 3 comprises an outer casing 21 as described herein, wherein the adapter element 23 may be secured thereto in various ways as previously described. With an adapter element 23 arranged and secured to the control cable 3 in advance, such a control cable may be very fast and easy to replace for an end user of a control system comprising such control cables 3. The adapter element 23, and the control cable 3 shown in FIG. 7 can, as should be obvious, be altered and modified according to their individual features and variations thereof, as explained throughout the disclosure.

The foregoing description of the embodiments has been furnished for illustrative and descriptive purposes. It is not intended to be exhaustive, or to limit the embodiments to the variations described. Many modifications and variations will obviously be apparent to one skilled in the art. The embodiments have been chosen and described in order to best explicate principles and practical applications, and to thereby enable one skilled in the arts to understand the invention in terms of its various embodiments and with the various modifications that are applicable to its intended use. The components and features specified above may, within the framework of the disclosure, be combined between different embodiments specified.

The invention claimed is:

1. A control system (1) for operating a mechanical function, the control system (1) comprising:

a lever (11), a housing (13), and at least one control cable (3),
the lever (11) being pivotable in at least one direction about a pivot point (15) and comprising at least one seat (9) for receiving a first coupling element (17) of the at least one control cable (3),
the at least one control cable (3) comprising the first coupling element (17), arranged at a first end (19) of said control cable (3), and an outer casing (21), axially movable relative said control cable (3),
the housing (13) comprising the pivot point (15), and being configured for receiving the at least one control cable (3) and to hold the outer casing (21) of said control cable (3) in a fixed position, wherein when assembled, a pivoting movement of the lever (11) moves the control cable (3) axially relative the housing (13) and the outer casing (21) of the control cable (3), which axial movement of the control cable (3) is utilized for performing said mechanical function, wherein the control system (1) further comprises at least one adapter element (23) and the housing (13) further comprises at least one first recess (25), configured for receiving an adapter element (23), wherein the at least one adapter element (23) and the at least one first recess (25) are form fitted with each other when coupled, which coupling locks the adapter element (23) relative the housing (13) in a direction parallel with an axial direction of the control cable (3),
the adapter element (23) comprises a body (27) with a second recess (29) therein, which is configured for receiving the outer casing (21) of the control cable (3) in the second recess (29) of the adapter element (23),
wherein the at least one seat (9) of the lever and the at least one first recess (25) of the housing (13) comprises respective first and second open spaces (33, 35) that are aligned with each other in an assembly direction (37), which is perpendicular to the axial direction of the control cable (3), allowing for a simultaneous coupling of the first coupling element (17) to the at least one seat (9) and the adapter element (23) to the at least one first recess (25) of the housing (13), along said assembly direction (37).

2. The control system (1) according to claim 1, further comprising: a second control cable (3), which comprises the same features as the at least one control cable (3), the lever (11) comprises a second seat (9), a first open space (33) of the second seat (9) being oriented perpendicular to the first open space (33) of the at least one seat (9), the housing (13) comprises a second first recess (25), arranged to receive and hold the second control cable (3), a second open space (35) of the second first recess (25) being oriented perpendicular to the second open space (35) of a first first recess (25), allowing for simultaneous coupling of the adapter element (23) of the second control cable (3) to the second seat (9) and a second adapter element (23) of the second control cable (3) to the second first recess (25), along the second assembly direction (37), which is perpendicular to the assembly direction (37) corresponding to the at least one control cable (3), and perpendicular to the axial direction of the control cable (3).

3. The control system (1) according to claim 1, wherein each adapter element (23), when fitted to the housing (13), constitutes a corner portion of the housing (13), which is rectangular shaped.

4. The control system (1) according to claim 1, wherein each first coupling element (17) of each control cable (3) is a ball joint, and each seat (9) of the lever (11) comprises a cylindrical bore (59), wherein the first open space (33) of said seat (9) is an open side of said bore (59), and wherein a slit (61) is arranged in a sidewall of said bore (59), which slit (61) is positioned between the seat (9) and the housing (13) when the lever (11) is in a neutral position, and extending along the assembly direction (37) of the seat (9).

5. The control system (1) according to claim 1, wherein each adapter element (23) of each control cable (3) comprises at least one protrusion (43), extending in a plane perpendicular to the axial direction of its corresponding control cable (3), and each first recess (25) of the housing (13) comprises at least one hole (45), corresponding in shape with the at least one protrusion (43), wherein said protrusion (43) and hole (45) are configured to be form fitted with each other when the adapter element (23) is coupled to the housing (13).

6. The control system (1) according to claim 1, wherein each coupling of an adapter element (23) and a first recess (25) is provided with second coupling means (49), configured to lock the adapter element (23) in position in the first recess (25).

7. The control system (1) according to claim 6, wherein the second coupling means (49) is configured for locking the adapter element (23) to the outer casing (21) of the control cable (3) and to the housing (13) simultaneously.

8. The control system (1) according to claim 1, wherein each second recess (29) is a through-hole, extending through the adapter element (23).

9. The control system (1) according to claim 1, wherein the lever (11) further comprises at least one input device of an auxiliary electrical system for operation of additional electrically operated functions.

10. The control system (1) according to claim 9, wherein the housing (13) further comprises an auxiliary recess, which is open towards a circumference of said housing, wherein the auxiliary recess is configured for receiving electrical wiring of the auxiliary electrical system so as to allow said wiring to pass through the housing (13).

11. The control system (1) according to claim 1, wherein the mechanical function to be operated is a valve (63) to be controlled, wherein said valve (63) comprises a valve spool (67), which is operable by means of an axial force thereto, the valve spool (67) having a bore (69) therein, said bore (69) being configured for receiving an end of a control cable (3), an inner sleeve element (71) having an externally threaded portion (73), and an outer sleeve element (75) having an internally threaded portion (77), the inner and outer sleeve elements (71, 75) further comprises opposite conical surfaces (79) at end portions thereof, wherein said conical surfaces (79) are configured to interact with each other when the threaded portions (73, 77) of the sleeve elements (71, 75) are engaged with each other, wherein the inner sleeve element (71) is pushed inwards so as to provide a clamping force to the outer casing (21) of the control cable (3) when inserted there through, the control cable (3) further comprises a second coupling element (81), arranged at a second end section (65) thereof, which second coupling element (81) is configured to fit in the bore (69) of the valve spool (67), the second coupling element (81) and the bore (69) further comprises locking means (83) for locking thereof relative each other.

12. The control system (1) according to claim 11, wherein the locking means (83) of the bore (69) and the second coupling element (81) is comprised of a circumferential slit (85) arranged at the second coupling element (81), and a hole (87) arranged in a sidewall to the bore (69), which hole (87) and slit (85) are arranged to align when the control cable (3) is inserted into the bore (69), the hole (87) is further configured for receiving a screw (89) therein, which screw (89) extends into the slit (85) of the second coupling element (81) when screwed into the hole (87).

13. The control system (1) according to claim 12, wherein the inner sleeve element (71) further comprises a hole (91), which is aligned with the hole (87) of the sidewall of the bore (69), for allowing operation of the screw (89), and the inner and outer sleeve elements (71, 75) are configured in such a way that, when the outer sleeve element (75) is fully threaded to the inner sleeve element (71), the outer sleeve element (75) covers the hole (91) in the inner sleeve element (71).

14. An adapter element (23) for coupling at least one control cable (3) to a housing (13) of a control system (1), the adapter element (23) comprising a body (27) with a second recess therein (29), which is configured for receiving an outer casing (21) of the at least one control cable (3), and first coupling means (31), being operational to fixate the outer casing (21) of the at least one control cable (3) in the second recess (29) of the adapter element (23), characterized in that the adapter element (23) is configured to be form fitted into a first recess (25) of the housing (13) of the control system (1) for operating a mechanical function, the control system (1) further comprising:
- a lever (11),
- the housing (13), and
- the at least one control cable (3),
- the lever (11) being pivotable in at least one direction about a pivot point (15) and comprising at least one seat (9) for receiving a first coupling element (17) of the at least one control cable (3),
- the at least one control cable (3) comprising the first coupling element (17), arranged at a first end (19) of said at least one control cable (3), and the outer casing (21), axially movable relative said at least one control cable (3),
- the housing (13) comprising the pivot point (15), and being configured for receiving the at least one control cable (3) and to hold the outer casing (21) of said at least one control cable (3) in a fixed position, wherein when assembled, a pivoting movement of the lever (11) moves the at least one control cable (3) axially relative the housing (13) and the outer casing (21) of the at least one control cable (3), which axial movement of the at least one control cable (3) is utilized for performing said mechanical function;
- wherein the at least one seat (9) of the lever and the first recess (25) of the housing (13) comprises respective first and second open spaces (33, 35) that are aligned with each other in an assembly direction (37), which is perpendicular to an axial direction of the at least one control cable (3), allowing for a simultaneous coupling of the first coupling element (17) to the at least one seat (9) and the adapter element (23) to the first recess (25) of the housing (13), along said assembly direction (37); and
- wherein the adapter element (23) and the first recess (25), when form fitted with each other, lock the adapter element (23) relative the housing (13) in a direction parallel with the axial direction of the at least one control cable (3).

15. A control cable (3) for translation of mechanical energy from a lever (11) of a control system (1) to a mechanical function, comprising a first coupling element (17), arranged at a first end (19) of said control cable (3), and an outer casing (21), axially movable relative said control cable (3) characterized in that it further comprises an adapter element (23) arranged at the outer casing (21) of the control cable (3), the adapter element (23) further comprising:
- a body (27) with a second recess therein (29), which is configured for receiving an outer casing (21) of the control cable (3), and first coupling means (31), being operational to fixate the outer casing (21) of the control cable (3) in the second recess (29) of the adapter element (23), characterized in that the adapter element (23) is configured to be form fitted into a first recess (25) of a housing (13) of the control system (1) for operating said mechanical function, the control system (1) further comprising:
- the lever (11), and
- the housing (13),
- the lever (11) being pivotable in at least one direction about a pivot point (15) and comprising at least one seat (9) for receiving the first coupling element (17) of the control cable (3),
- the housing (13) comprising the pivot point (15), and being configured for receiving the control cable (3) and to hold the outer casing (21) of said control cable (3) in a fixed position, wherein when assembled, a pivoting movement of the lever (11) moves the control cable (3) axially relative the housing (13) and the outer casing (21) of the control cable (3), which axial movement of the control cable (3) is utilized for performing said mechanical function;
- wherein the at least one seat (9) of the lever and the first recess (25) of the housing (13) comprises respective first and second open spaces (33, 35) that are aligned with each other in an assembly direction (37), which is perpendicular to an axial direction of the control cable (3), allowing for a simultaneous coupling of the first coupling element (17) to the at least one seat (9) and the adapter element (23) to the first recess (25) of the housing (13), along said assembly direction (37); and
- wherein the adapter element (23) and the first recess (25), when form fitted with each other, lock the adapter element (23) relative the housing (13) in a direction parallel with the axial direction of the control cable (3).

* * * * *